UNITED STATES PATENT OFFICE.

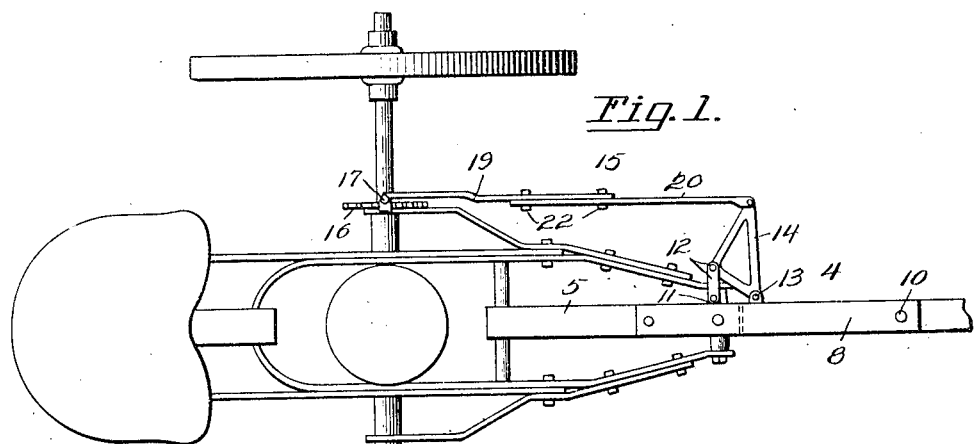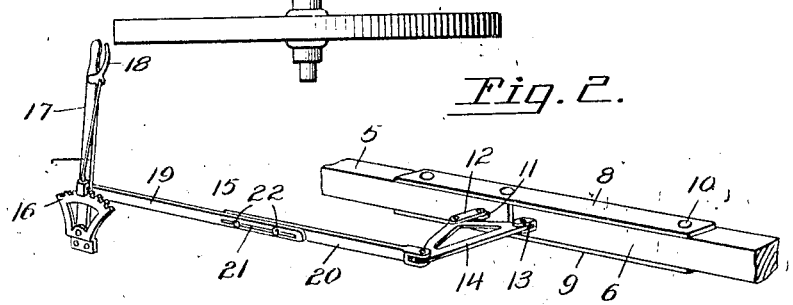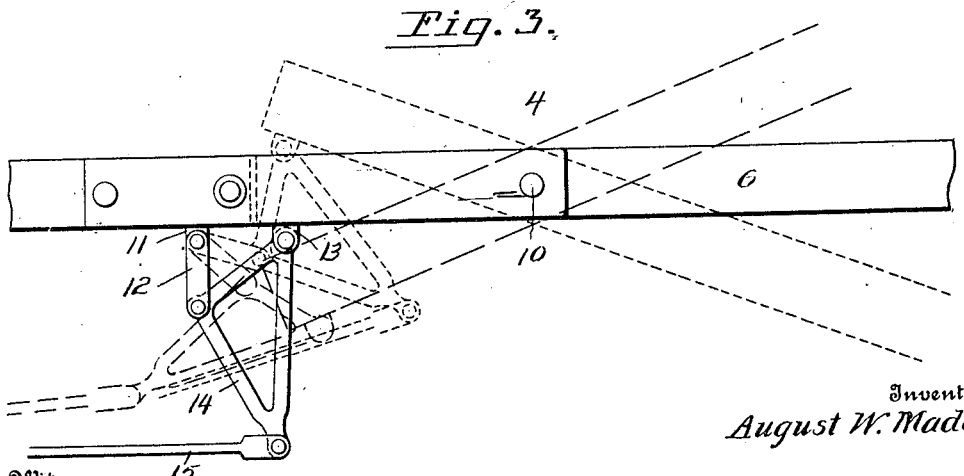

AUGUST W. MADER, OF SEGUIN, TEXAS.

TONGUE FOR FARM IMPLEMENTS.

No. 910,076.　　　　Specification of Letters Patent.　　　Patented Jan. 19, 1909.

Application filed March 25, 1908. Serial No. 423,238.

*To all whom it may concern:*

Be it known that I, AUGUST W. MADER, a citizen of the United States, residing at Seguin, in the county of Guadalupe and State of Texas, have invented new and useful Improvements in Tongues for Farm Implements, of which the following is a specification.

This invention relates to tongues for farm implements and the object of the invention is to provide an implement tongue which may be readily regulated in regard to the line of draft of the implement, and effectively retained in adjusted position.

With these objects in view the invention resides in the novel construction and combination of parts, hereinafter fully described and claimed.

In the accompanying drawings, Figure 1 is a top plan view of a wheeled implement provided with my improvements. Fig. 2 is a perspective view of a portion of the beam and the mechanism employed for swinging and retaining in position the outer section of the beam. Fig. 3 is a top plan view of a portion of the beam illustrating in dotted lines the various angles at which the beam may be positioned.

This improvement is adapted for application upon farm implements of all descriptions employing tongues or beams and in the accompanying drawings I have illustrated the device applied to a wheeled implement.

In the drawings the numeral 4 designates a beam or tongue of a farm implement. The tongue 4 is divided into two sections 5 and 6. The section 5 of the tongue is secured to the implement in any preferred or desired manner. Rigidly secured to the section 5 of the beam and upon the top and bottom thereof are the straps 8 and 9. These straps 8 and 9 have their free ends extending a suitable distance beyond the section 5, and are each provided with alining openings adapted for the reception of a pintle 10, by which the section 6 of the beam is pivotally secured. The section 5 is provided upon one of its sides with an ear 11, adapted for pivotal connection with a link 12. The section 6 of the beam is provided with a bracket 13 to which one end of the V-shaped bell crank lever 14 is attached. The bell crank lever 14 is also secured to the link 12, and the free end of the lever is adapted for engagement with an operating bar 15.

Secured upon the implement is a toothed segment 16, and pivotally secured upon this segment is a lever 17, having a spring pressed pawl adapted for engagement with the teeth of the segment and operated by a handle 18. The lever 17 is pivotally connected to the bar 15, and it will be noted that by operating the lever 17 the section 6 of the beam 4 is swung upon its pivot 10 in either direction, and securely retained in adjusted position by the spring pressed pawl engaging the teeth of the segment.

The bar 15 may be constructed in two sections 19 and 20. The section 19 is provided with a slot 21, and the section 20 is provided with headed bolts 22, adapted for engagement with the slot of the section 19 and providing means whereby the sections may be lengthened or shortened upon each other when desired.

From the above description it will be noted that a simple, cheap and effective device is provided for regulating the beam or tongue of an implement in regard to the line of draft, and wherein the adjusted tongue is secured rigidly and effectively.

Having thus fully described the invention what is claimed as new is:

An implement tongue comprising a pair of sections one hingedly connected with the other section, a strap pivoted to the rigid section, a bell crank lever pivotally connected with the strap and with the movable section of the tongue, an adjustable bar connected with the bell crank lever, means for moving the bar to swing the pivoted portion of the tongue transverse of the rigid section, and means for immovably securing the pivoted elements.

In testimony whereof I affix my signature in presence of two witnesses.

AUGUST W. MADER.

Witnesses:
　F. SUCHART,
　J. R. FEIGERLE.